United States Patent
Konz

(10) Patent No.: US 7,443,275 B2
(45) Date of Patent: Oct. 28, 2008

(54) DEVICE FOR ABSORBING NOISE

(75) Inventor: Oliver Konz, Ilshofen (DE)

(73) Assignee: Wurth Elektronik eiSos GmbH & Co. KG, Waldenburg (DE)

( * ) Notice: Subject to any disclaimer, the term of this patent is extended or adjusted under 35 U.S.C. 154(b) by 0 days.

(21) Appl. No.: 10/558,975

(22) PCT Filed: May 27, 2004

(86) PCT No.: PCT/EP2004/005696

§ 371 (c)(1),
(2), (4) Date: Dec. 8, 2006

(87) PCT Pub. No.: WO2004/107613

PCT Pub. Date: Dec. 9, 2004

(65) Prior Publication Data

US 2007/0099503 A1    May 3, 2007

(30) Foreign Application Priority Data

Jun. 3, 2003   (DE) ................. 103 26 685

(51) Int. Cl.
*H01F 17/06* (2006.01)
(52) U.S. Cl. ...................................... 336/178
(58) Field of Classification Search .......... 336/65, 336/90–96, 173–176, 178; 174/377, 138

See application file for complete search history.

(56) References Cited

U.S. PATENT DOCUMENTS

| | | | |
|---|---|---|---|
| 5,291,172 A | 3/1994 | Ito et al. | |
| 5,736,672 A * | 4/1998 | Huang | 174/377 |
| 6,144,277 A | 11/2000 | Matsui et al. | |
| 6,262,361 B1 | 7/2001 | Konz | |
| 6,285,265 B1 * | 9/2001 | Morita et al. | 333/12 |
| 6,400,248 B1 | 6/2002 | Konz | |
| 6,559,748 B1 | 5/2003 | Nankano | |

FOREIGN PATENT DOCUMENTS

DE    3932021 A1    4/1990

OTHER PUBLICATIONS

German search report No. 103 26 685.2 dated Jan. 14, 2004.

* cited by examiner

*Primary Examiner*—Tuyen T. Nguyen
(74) *Attorney, Agent, or Firm*—Boyle Fredrickson, S.C.

(57) ABSTRACT

A device for absorbing electrical noise on cables containing a housing comprising a pair of halfshells is disclosed. A grooved ferrite component resides within each halfshell. Flat tabs that come to rest between facing surfaces of the ferrite components when the housing is closed are formed onto the housing, thereby creating a ferrite component that has a defined air gap.

11 Claims, 2 Drawing Sheets

DEVICE FOR ABSORBING NOISE

Figure 1:
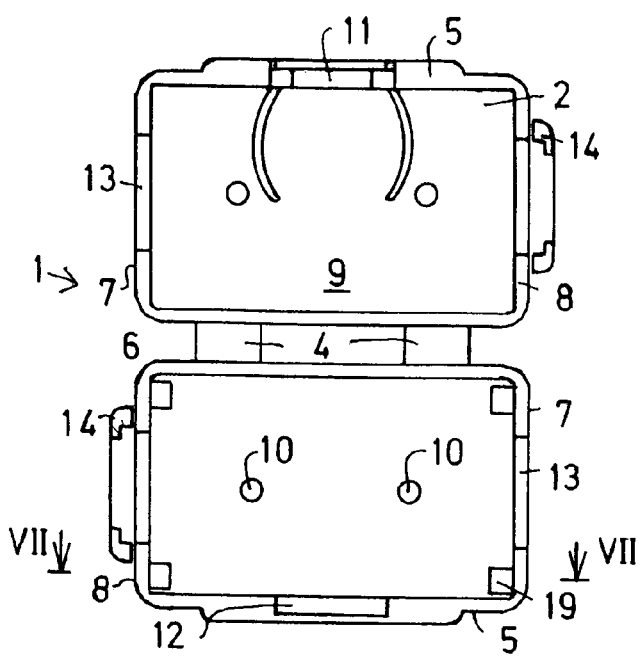

The invention is based on a device for absorbing electrical noise on a line.

That high-frequency interference that can interfere with the operation of electronic equipment is transmitted on electrical lines is known. Such erratic, high-frequency interference is termed "noise."

That rings fabricated from metallic, magnetic, or similarly acting materials, in particular, ferrites, that are capable of absorbing such electrical interference may be arranged around lines is also known. In the case of the frequency bands that have usually been involved to date, it has been presumed that a closed ring fabricated from a ferrite material surrounding the electrical cable involved would have to be present. Configuring such rings in two parts, each of which has a groove, in order to be able to retrofit devices for absorbing noise is common knowledge. The two parts are then arranged around the cable and coupled such that facing surfaces thereof form flush fits. Spring-loading is even employed in order to preclude air gaps between them.

However, those known, gapless devices for absorbing electrical noise have their limitations at high frequencies where lines carrying high direct currents are involved.

The problem addressed by the invention is creating a device for absorbing electrical noise on lines that will also yield satisfactory results at high frequencies and in cases involving large DC-components.

In order to solve that problem, the invention proposes a device for absorbing electronic noise on lines that has those features stated in claim 1. Elaborations on the invention are covered by subclaims.

In cases where frequencies falling within the range 100 MHz to 200 MHz occur, the air gap provides that the impedances of the ferrite constituent will be increased. Furthermore, the ferrite material will become magnetized and reach saturation at currents of around 4 Amperes. When that occurs, filtering of high-frequency interference will cease. However, that effect may also be avoided by providing an air gap.

The air gap between the two parts is much narrower than both the diameter of the passageway for routing the cable and the cable diameter in order that the configuration comprising two mutually complementary parts will remain a reasonable approach.

In order to ease the task of attaching a device proposed by the invention to a cable, according to the invention, under an elaboration thereon, it may be provided that the housing is configured from a pair of halfshells, each of which accommodates within it a part fabricated from the noise-absorbing material. The device may then be manufactured and marketed in the fashion that a part fabricated from the noise-absorbing material is accommodated within each of the housing's halfshells. Pairs of halfshells may then be coupled on site, in the field, employing simple means that require no use of tools.

Both halfshells and both parts might also be identically configured and the installer provided with a correspondingly large number of parts.

However, under an elaboration on the invention, the housing's pair of halfshells may be joined by a foil hinge, in which case, the device may be treated as a single unit in order to eliminate hazards that components that are not intended to be coupled to one another will be coupled to one another.

Once they have been brought into position on a cable, the housing's pair of halfshells might, for example, be coupled by either wrapping tape around them or latching them together, regardless of whether they are joined by a foil hinge. However, it will be particularly helpful if the device has a latching mechanism that may have a tab on one halfshell and a recess on the other halfshell, where the tab and recess form the latching mechanism. For example, the tab might have a prong that engages the underside of an undercut situated within the recess.

The tab might, for example, be arranged on an edge of the housing, i.e., in particular, at a location thereon adjoining a plane separating its pair of halfshells.

In order to allow compensating for variations in the width of the air gap between the latter when the housing is closed, according to the invention, it may be provided that the wall of one of the housing's halfshells has incisions adjoining either side of the tab or other component forming part of the latching mechanism, which will give the latching mechanism a certain resilience. In particular, it may be provided that the incisions extend around an edge of the housing, i.e., onto the base of the respective halfshell involved. The latching mechanism will be more or less resilient, depending upon how far the incisions extend.

The aforementioned spacer determining the width of the air gap may, for example, under an elaboration on the invention, be formed onto the housing, in particular, formed onto a halfshell, in which case the spacer will not represent a separate component. For example, the spacer might be a short strip that is formed onto the housing. It might, for example, be shaped such that will automatically face the associated surface of one of the ferrite parts when the housing is assembled or flipped shut.

In particular, in order to allow creation of a narrow air gap having a uniform width, it may be provided that the device has several spacers. In particular, the spacers might be configured such that, at a pair of facing surfaces, the two parts are separated by a gap.

Figure 2:
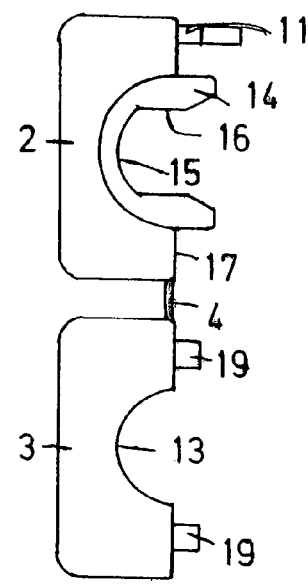
Figure 3:
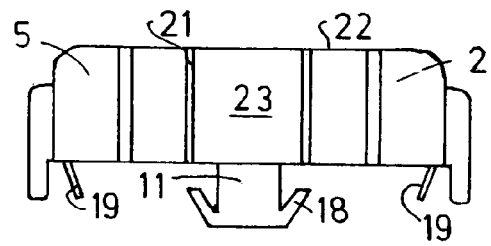
Figure 4:
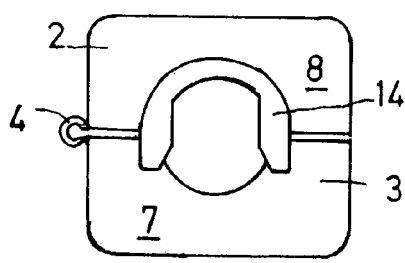
Figure 6:
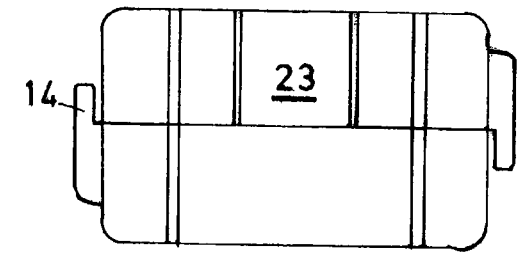
Figure 5:
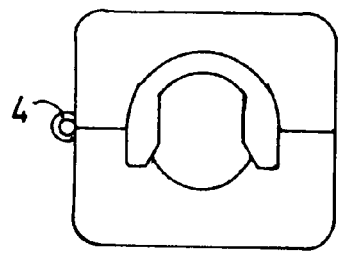
Figure 7:
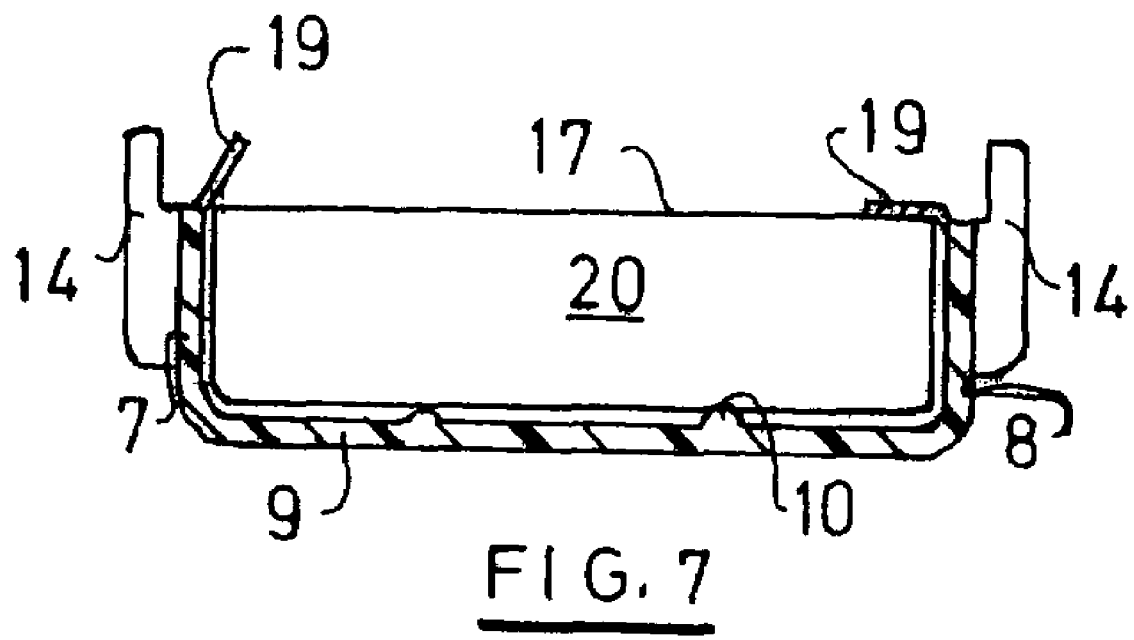

Further features, details, and benefits of the invention will be evident from the claims and the abstract, whose wording is herewith made an integral part of this description by way of reference thereto, the following description of a preferred embodiment of the invention, and the figures, which depict:

FIG. 1 a top view of the open housing;

FIG. 2 an end view of the arrangement shown in FIG. 1;

FIG. 3 a side view of the device shown in FIG. 1;

FIG. 4 an end view of the closed housing;

FIG. 5 a view corresponding to that of FIG. 4, where the air gap has a varying width;

FIG. 6 a side view of the closed housing;

FIG. 7 a longitudinally sectioned view of a halfshell indicating the ferrite part accommodated therein.

FIG. 1 depicts a top view of the open housing 1, which consists of a pair of halfshells 2, 3 that are joined by a foil hinge 4 in the vicinities of their adjoining surfaces. Each halfshell has a roughly cubical shape exhibiting a pair of sidewalls 5, 6 and a pair of end walls 7, 8. The sidewalls 5, 6 of each halfshell are mutually parallel, as are their end walls 7, 8. The bottoms of both halfshells 2, 3, which lie beneath the plane of the paper in FIG. 1, are each closed by a base 9. That base 9 has one or more hemispherical protrusions 10 along its centerline for angularly aligning the ferrites to be inserted into the halfshells. A tab 11 is formed onto that side of the sidewall 5 of one halfshell 2 that faces away from the other halfshell 3, while the corresponding sidewall 5 on the latter has a recess 12 at the same location along its length.

Each end wall 7, 8 has a central, semicircular notch 13 that forms half of a roughly circular hole when the two are joined.

A clip 14 that forms a receptacle having a pair of parallel sidewalls 16 is formed onto the outer surface of one end wall 8. That clip 14 is used for sliding the housing onto a cable, where the edges of its sidewalls 16 clamp the cable.

The flat surfaces 17 on the edges of the pair of halfshells 2, 3, both of which lie in a common plane and form the plane separating them when the housing is assembled, may be seen in FIG. 1. The latter plane also appears on the right in FIG. 2.

FIG. 3 depicts a top view of the arrangement consisting of the pair of halfshells shown in FIG. 1. The tab 11 protruding from that edge of one of the housing's halfshells that lies in the plane separating them now lies in the plane of the paper. The tab 11 has a moderately rigid section, on whose far end a pair of reverse-raked prongs 18 are formed. The intended purpose of the latter is engaging the undersides of associated undercuts situated within the recess 12.

Small tabs 19 protruding obliquely upward from the inner surfaces of the end walls 7, 8 of one halfshell, in the case of the sample embodiment shown, that halfshell 3 accommodating the recess 12 (cf. FIG. 3), are formed thereon, in the vicinities their edges 14. These small spacers, or strips, forming tabs 19 (cf. FIG. 1) are formed thereon at locations situated between its sidewalls 5, 6 and the notch 13. The ferrite parts for absorbing electrical noise, which have conduits resembling grooves, constitute extensions of the notches 13 when inserted into the halfshells. The lateral surfaces of both ferrite parts are situated in vicinities lying between the edges of the notches 13 and extending along the inner surfaces of the housing's sidewalls 5, 6. As shown in FIG. 7, the tabs 19 abut against their lateral surfaces while the housing is closed. FIG. 7 depicts a longitudinally sectioned view of a halfshell taken along the line VII-VII shown in FIG. 1. The aforementioned tabs 19 are formed onto the inner surfaces of its end walls 7, 8. The orientations of the tabs 19 appearing on the left in FIG. 7, namely, protruding obliquely upward, are those for the case where the housing is open. The included angle between them and the plane 17 separating the halves of the housing, which coincides with the upper lateral surface of the ferrite part, is approximately 60°. If the housing is then flipped closed, which means that the other ferrite part 20 will approach the former ferrite part from above, the tabs 19 will be bent over and lie flat on the latter's upper lateral surface (cf. the tab shown on the right in FIG. 7). Since, in the case of the example of a preferred embodiment shown, four such tabs 19 are present, two air gaps that have precisely defined widths equaling the thickness of the tabs 19 will be formed between the pair of ferrite parts 20.

Variations in the thicknesses of the tabs 19 are compensated for by providing that the housing closes to greater or less degrees, as may be seen by comparing FIGS. 4 and 5. The width of the air gap will invariably be determined by the tabs 19, no matter what the tolerances on the ferrite parts may be. If devices having various air gaps should be needed for special cases, redimensioning the thicknesses of the tabs 19 during manufacture of the housing are all that will be required in order to accommodate them.

Another embodiment that will now be described based on FIGS. 1 and 3 improves the device's closure behavior. Incisions 21 normal to the plane separating the housing's halfshells extend along either side of that section of that sidewall 5 on which the tab 11 is situated and around the edges 22 of the housing, as may be seen in FIG. 3, and are continued roughly out to the center of the base 9 of the halfshell 2 involved (cf. the curved incisions 21 appearing near the top of FIG. 1). In the case of the sample embodiment shown, they are slightly curved, but might also be straight, inclined relative to one another or to the housing's end walls, or have some other shape or orientation. That section 22 of the sidewall bounded by the incisions 21 and the base 9 is thus able to flex relative to the remainder of that halfshell in order that it may force the two ferrite parts up against the tabs 19 lying between them by virtue of the restoring force generated by its deformation, which will also serve to set a precisely defined air gap.

The invention claimed is:

1. A device for absorbing electrical noise on cables having a housing (1),
   two parts having facing surfaces and being fabricated from a material that absorbs electrical noise, the two parts being arranged within the housing (1) and
   forming between them a passageway for a cable when the housing (1) is closed, and
   at least one spacer that may be arranged between the facing surfaces of the two parts; and
   wherein the spacer is configured such that an air gap is maintained between pairs of facing surfaces of the two parts to assist in absorbing of electrical noise.

2. A device according to claim 1, wherein the housing (1) is assembled from a pair of halfshells (2,3), each of which accommodates within it one of the two parts fabricated from a material that absorbs electrical noise.

3. A device according to claim 2, the at least one spacer has a predetermined thickness to provide an air gap having a predetermined thickness corresponding to a desired electrical property for the absorbing of electrical noise.

4. A device according to claim 3, wherein the pair of halfshells (2,3) are joined by a foil hinge (4).

5. A device according to claim 2 having a latching mechanism that has a tab (11) on one halfshell (2) and a recess (12) on the other halfshell (3).

6. A device according to claim 5, wherein the tab (11) is arranged on an edge of the housing.

7. A device according to claim 5, wherein the housing has a wall (5) having incisions (21) on either side of the tab (11).

8. A device according to claim 7, wherein the incisions (21) extend around the edge (22) of the housing.

9. A device according to claim 1, wherein the spacer is formed onto the housing (1), in particular, is formed onto a halfshell (3) as a flexible tab hinged to half shell.

10. A device according to claim 1, wherein the at least one spacer is a short, narrow strip.

11. A device according to claim 1, wherein the at least spacer comprises a plurality of spacers.

* * * * *